US011738507B2

(12) United States Patent
Barnes (10) Patent No.: US 11,738,507 B2
(45) Date of Patent: Aug. 29, 2023

(54) ADDITIVE MANUFACTURING TEMPERATURE (71) Applicant: HEWLETT-PACKARD DEVELOPMENT COMPANY, L.P., Spring, TX (US)

(72) Inventor: Arthur H Barnes, Vancouver, WA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 357 days.

(21) Appl. No.: 16/608,882

(22) PCT Filed: Oct. 4, 2017

(86) PCT No.: PCT/US2017/055105
§ 371 (c)(1),
(2) Date: Oct. 28, 2019

(87) PCT Pub. No.: WO2019/070250
PCT Pub. Date: Apr. 11, 2019

(65) Prior Publication Data
US 2020/0230877 A1 Jul. 23, 2020

(51) Int. Cl.
B29C 64/165 (2017.01)
B33Y 40/00 (2020.01)
(Continued)

(52) U.S. Cl.
CPC ......... B29C 64/165 (2017.08); B29C 64/393 (2017.08); B33Y 40/00 (2014.12);
(Continued)

(58) Field of Classification Search
CPC ......... B33Y 10/00; B33Y 40/00; B33Y 50/02; B29C 64/165; B29C 64/393
See application file for complete search history.

(56) References Cited

U.S. PATENT DOCUMENTS 6,815,636 B2   11/2004   Chung et al.
9,172,829 B2   10/2015   Boyer et al.
(Continued)

FOREIGN PATENT DOCUMENTS

CN    1135732 A     11/1996
CN    106794605 A   5/2017
(Continued)

OTHER PUBLICATIONS

Wing, I et al., 3D Opportunity for Quality Assurance and Parts Qualification, Nov. 18, 2015.

Primary Examiner — Michael P Wieczorek
(74) Attorney, Agent, or Firm — Shook, Hardy & Bacon L.L.P.

(57) ABSTRACT

Some examples include a method of operating an additive manufacturing machine including forming a layer of a build material, selectively applying a fusing agent onto the formed layer of build material, applying fusing energy to the build material and fusing agent with a thermal energy source to form an object layer of a three dimensional object and a sacrificial layer of a sacrificial object at the selectively applied fusing agent, sensing a thermal temperature of the sacrificial layer, comparing the sensed thermal temperature of the sacrificial layer to a target temperature, and adjusting a power level of the thermal energy source based on the compared temperatures.

11 Claims, 4 Drawing Sheets (51) Int. Cl.
  *B29C 64/393* (2017.01)
  *B33Y 10/00* (2015.01)
  *B33Y 50/02* (2015.01)
  *H04N 1/00* (2006.01)

(52) U.S. Cl.
  CPC .......... *H04N 1/00978* (2013.01); *B33Y 10/00* (2014.12); *B33Y 50/02* (2014.12)

(56) References Cited

U.S. PATENT DOCUMENTS

| | | |
|---|---|---|
| 9,522,426 B2 | 12/2016 | Das et al. |
| 2001/0045678 A1 | 11/2001 | Kubo et al. |
| 2016/0349724 A1 | 12/2016 | Cortes et al. |
| 2017/0217104 A1 | 8/2017 | Cortes I Herms et al. |

FOREIGN PATENT DOCUMENTS

| | | | | |
|---|---|---|---|---|
| EP | 0731743 A1 | 9/1996 | | |
| JP | 2015112846 | 6/2015 | | |
| WO | WO-1995011100 A1 | 4/1995 | | |
| WO | WO-2016050319 | 4/2016 | | |
| WO | WO-2016050319 A1 * | 4/2016 | ......... | B29C 35/0288 |
| WO | WO-2016068899 A1 | 5/2016 | | |
| WO | WO-2016094827 A1 | 6/2016 | | |
| WO | WO-2016119889 A1 | 8/2016 | | |
| WO | WO-2016195665 | 12/2016 | | |
| WO | WO-2016195665 A1 * | 12/2016 | ........... | B29C 64/165 |

\* cited by examiner

ADDITIVE MANUFACTURING TEMPERATURE

BACKGROUND

Additive manufacturing machines produce three dimensional (3D) objects by building up layers of material. Some additive manufacturing machines are commonly referred to as "3D printers". 3D printers and other additive manufacturing machines make it possible to convert a CAD (computer aided design) model or other digital representation of an object into the physical object. The model data may be processed into layers, each defining that part of a layer or layers of build material to be formed into the object.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

The descriptions and examples provided herein can be applied to various additive manufacturing technologies, environments, and materials. For example, in some additive manufacturing technologies, a layer of build material can be formed with a roller, or recoater, and a fusing agent can be dispensed with a printhead. Both the recoater and the printhead may be carried on a moving carriage system. A thermal energy source can also be mounted on the carriage system and moved across a build surface. In an example additive manufacturing process, energy may then be applied to the layer of build material to solidify those portions of the layer on which fusing agent was deposited to form a layer of an object being generated. The thermal energy source can apply a heating energy, suitable to heat the build material to a pre-fusing temperature, and a fusing energy, suitable to fuse the build material where fusing agent has been applied. An example additive manufacturing technology can dispense a suitable fusing agent in a desired pattern with a printhead, based on data from a three dimensional (3D) object model, onto a layer of build material on a build surface in a build chamber and then expose the layer of build material and the fusing agent to an energy source, such as a thermal energy source. The build material can be a powder-based type of build material and the fusing agent can be an energy absorbing liquid that can be applied to the build material. For example, powder based build material can include plastic, ceramic, and metal powders. The energy source can generate heat that is absorbed by fusing energy absorbing components of the fusing agent to sinter, melt, fuse, or otherwise coalesce the patterned build material. The patterned build material can solidify and form an object layer, or a cross-section, of a desired build object. The process is repeated layer by layer to complete the 3D build object.

In additive manufacturing, it is desirable to precisely control the surface temperature of a part as it is being fabricated. Temperature control is applicable across various additive manufacturing technologies, environments, and materials. Temperature variations can cause undesirable build variations (i.e., part defects). During the solidification process, non-uniform temperature distribution or unbalanced thermal stress can cause warpage or otherwise affect the dimensional accuracy and material properties of the build object. For example, if the build layer becomes too hot, the patterned fusing agent perimeter may "bleed" into the surrounding build material that isn't intended to fuse and result in incorrect geometry, dimensions and appearance. Additionally, the increased heat can undesirably affect the subsequent layer of build material with uncontrolled fusing. Alternatively, if the build layer is too cold, the material properties can be inadequate in certain mechanical properties including ultimate tensile strength, elongation at break, and impact strength, for example. As such, controlling the build temperatures during fusing is highly desirable.

Determining accurate part surface temperatures as feedback is useful for correct fusing energy dosing during a build process. Many factors contribute to part surface temperature including incoming build material mass variation, build material temperature variation, build material melt enthalpy, contamination of the fusing system, convective air currents in the chamber, as well as other factors.

Precision temperature control of the build object during fabrication can be difficult. For example, precise temperature measurements can be difficult using some types of thermal sensors, such as low resolution infrared thermal cameras. For example, the camera pixel size used for measurement by the thermal camera can be as large as 10 mm×10 mm. Each camera pixel covers an effective area of the build surface. The size of the effective area will depend on the size of the camera pixel, the height of the camera above the build surface, and the camera optics, for example. Objects, or object parts, formed on the build surface can be smaller than the effective area, making it difficult to obtain accurate temperature measurements. Often, the temperatures of build parts or part features of smaller size than the effective area cannot be accurately measured. Object parts that are smaller than the effective area, for example, can have a thermal temperature that is influenced by cooler build material surrounding the object part. For example, where a portion of an object is not completely covered by a camera pixel, the temperature measured by that camera pixel will be an average of the temperature of the object portion and the temperature of surrounding build powder. This can cause the sensed temperature to be lower than the actual temperature of the object part. Accurate control of the build temperature while forming a build object on the build surface without relying on the build object temperature detection in the build area can be useful. However, since the nature of objects being generated may not be suitable for providing an area, or location, which can be used to take thermal measurements from, the examples herein provide for generating a so-called 'sacrificial object' along with the desired object being generated. The sacrificial object, so-called as it is intended to be discarded once complete, is generated to have a consistent repeatable feature upon which thermal measurements can be made and thermal feedback can be provided.

For example, a sacrificial object can be formed, or disposed, in the buildable area of the build chamber to provide thermal feedback to the fusing process and system for adjusting and applying the desired or appropriate amount of energy to the build parts in the buildable area to increase the sintering process for better and more consistent build object quality. As used herein, sacrificial objects are three dimensional objects formed by an additive manufacturing machine that are not part of the desired build object. The sacrificial object is formed (e.g., sized and positioned) based on data generated by the additive manufacturing machine. The sacrificial object not part of the customer's build object and can be discarded at the end of the build.

The temperature of the top surface layer(s) of the sacrificial object can be measured, for example using a thermal camera, and used as feedback and applied to a controller, such as a proportional integral derivative (PID), that adjust the power level supplied to the thermal heat source. The temperature feedback of the top layer(s) of the sacrificial object can be used to adjust the power level applied for heating and fusing of the next layer of the build object. In one example, the sacrificial object can be formed in a thermal boundary region (where present) so they will not impact the customer's buildable area. The sacrificial object can be formed in all, or in at least some, of the layers of the build object to provide an accurate indicator of build object temperature throughout the build process. The sacrificial object can be formed in layers preceding the customer's build object to assist with establishing and stabilizing the build object temperature prior to beginning the customer's build object. Temperature of the sacrificial object can be used as an accurate indication of the temperature of the build objects in the buildable area.

Figure 1:
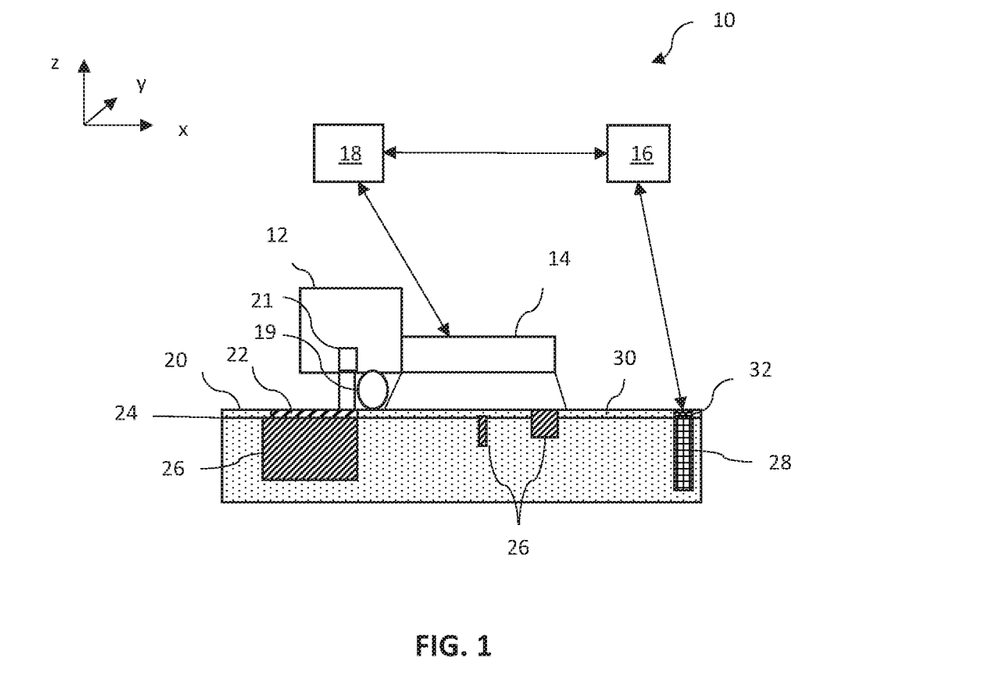
FIG. 1 is a schematic cross-sectional side view of an example additive manufacturing system in accordance with aspects of the present disclosure.

FIG. 1 is a schematic side view of an example additive manufacturing system 10 in accordance with aspects of the present disclosure. Additive manufacturing system 10 includes a dispensing assembly 12, a thermal energy source 14, a thermal sensor 16, and a controller 18. Dispensing assembly 12 can include a build material spreader 19 to dispense and spread a build material 20 and a fusing agent dispenser 21 to dispense fusing agent 22 on a build surface 24. The build material spreader 19 can include a wiper or a re-coater roller, for example, to spread a dispensed pile of build material 20 over build surface 24. The fusing agent dispenser 21 can include a printhead, for example. Build surface 24 can be a build platform or a previously formed layer of build material, for example. Build material 20 can be dispensed and spread to form a layer on build surface 24 and then fusing agent 22 can be selectively dispensed onto the newly formed layer of build material 20. Thermal energy source 14 can heat and fuse build material 20 on which a fusing agent 22 has been applied to form a layer of a three dimensional build object 26. Build material 20 and fusing agent 22 can also be heated in the same manner by thermal energy source 14 to form a layer of a sacrificial object 28.

Dispensing assembly 12 and thermal energy source 14 can be mounted to a carriage (not shown) that can be movable across build surface 24 of build area in an x-axial direction to dispense build material 20 and fusing agent 22 as well as heat and fuse build material 20 and fusing agent 22. For example, dispensing assembly 12 and thermal energy source 14 can be movable bi-directionally along the x-axis of build surface 24 to form a new layer of build material 20, to print fusing agent 22 on the new layer of build material 20 based on print instructions, and to fuse build material 20 that fusing agent 22 has been applied to. Build material 20 is disposed in layers and fusing agent 22 is selectively applied to the layers of build material 20 to form object layers of three dimensional build object 26 and sacrificial layers of sacrificial object 28 corresponding to the selective application of fusing agent 22. Only one build layer 30 is identified in FIG. 1 for clarity, although it is understood that additional object layers are included below the identified build layer 30. Build layers 30 are fused together where fusing agent 22 has been applied to build material 20 to form 3D build object 26 based on the print instructions for the customer desired object and as positioned for build in the build chamber as desired by the customer.

Thermal sensor 16 can measure thermal temperatures of surfaces of build layer 30 including build object 26 and sacrificial object 28. Thermal sensor 16 can be a thermal imaging camera, for example. Controller 18 can compare the measured thermal temperature obtained by thermal sensor 16 to a target temperature. Controller 18 can be a proportional integral derivative (PID) controller, for example, although other types of controllers can also be acceptable. Controller 18 can adjust a power level of thermal energy source 14 based on the compared measured thermal temperature and target temperature. The adjusted power level can be applied to a next, or subsequent, layer of build object 26. In one example, the power level is adjusted as the carriage system carrying thermal energy source 14 is outside of the build area when changing direction for the next pass and is constant during the subsequent pass. The adjusted power level can be constant as thermal energy source 14 passes over the build area. In another example, the power level of thermal energy source 14 can be adjusted as the thermal energy source 14 traverses over the build area. Thermal sensor 16 and controller 18 can be independently mounted in the additive manufacturing system 10.

Figure 2:
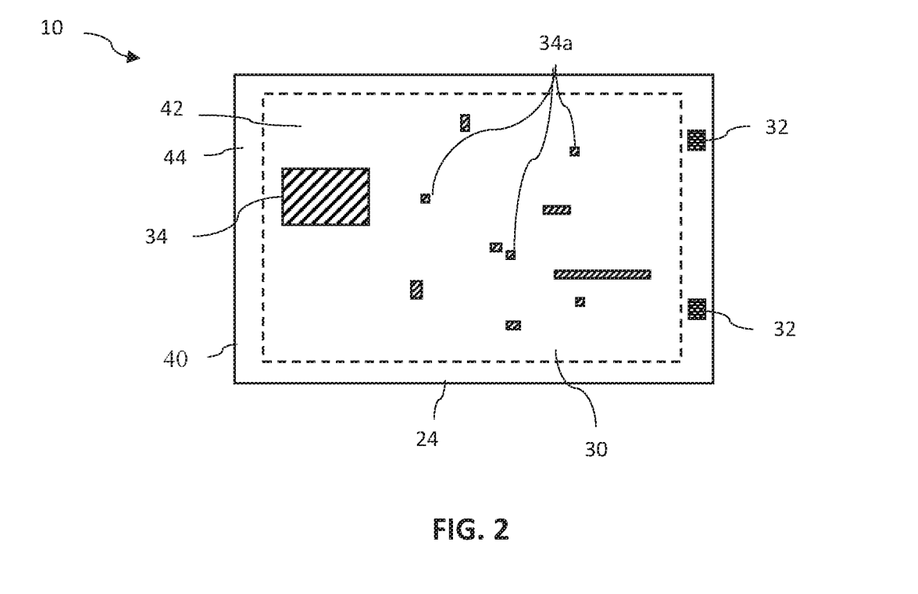
FIG. 2 is a top view of an example build surface of an additive manufacturing system in accordance with aspects of the present disclosure.

FIG. 2 is a top view of an example build surface 24 of additive manufacturing system 10 in accordance with aspects of the present disclosure. Build surface 24 (e.g., a z-axis moveable build platform or a previously formed layer of build material) is disposed within a build chamber 40 and can include a build area 42 and a thermal boundary region 44. Thermal boundary region 44 is a 'virtual' region than be defined to occupy any predefined portion of build surface 24. In some examples, thermal boundary region 44 can include layers of build material 20 near the perimeter edges of build surface 24 within build chamber 40. Thermal boundary region 44 included at the perimeter of build chamber 40 can be suitable for sacrificial layer 32 but can have higher thermal conduction and thermal characteristics that are not optimal for producing high quality build objects, for example.

Build layer 30 disposed on build surface 24 and can include object layer 34 of example build object 26 and sacrificial layer 32 of an example sacrificial object 28. Object layer 34 is disposed within build area 42. Sacrificial object 28 is disposed in a predetermined position in build chamber 40 and has a predetermined cross-sectional size on build surface 24. Sacrificial layer 32, in one example, can be disposed within thermal boundary region 44 to provide use of the entire build area 42 for customer desired build object 26. Sacrificial layer 32 can be any suitable size, shape, and position on build surface 24 that can have an effective area of at least one camera pixel to be sensed by thermal sensor 16. In some examples, sacrificial layer 32 can have an effective area of several camera pixels. In some examples, size, shape and location of sacrificial layer 32 is predetermined by additive manufacturing machine 10.

Thermal boundary region 44 can form a perimeter area around the build area 42 of build surface 24. As illustrated, sacrificial layer 32 can be formed in thermal boundary region 44 outside of build area 42. Although two sacrificial objects 28 are shown in FIG. 2, a single sacrificial object 28 can be employed (see, e.g., FIG. 1) or multiple sacrificial objects 28 can be employed. Sacrificial object 28 can be positioned in thermal boundary region 44 on one or multiple sides of build area 42. In one example, more than one sacrificial object 28 is employed and an average of the measured temperatures of the more than one sacrificial objects 28 can be averaged to a resultant measured temperature.

In one example, thermal boundary region 44 can encompass a 25 mm perimeter width of build surface 24 around build area 42. In one example, sacrificial object 28 is 15 mm wide and is centered within the 25 mm wide thermal boundary region 44. Build material 20 generally has a low thermal conductivity. A margin of build material 20 can be maintained between build area 42 and sacrificial layer 32 and a margin of build material can be maintained between sacrificial layer 32 and a wall of build chamber 40 to provide some thermal insulation to sacrificial layer 32. In some examples, at least a 5 mm margin of unfused build material 20 around sacrificial layer 32 is employed.

Object layer(s) 34 forming 3D build object 26 can include object parts, or object part layers 34*a*, that are too small to be accurately measured by thermal sensor 16. Object parts including object part layers 34*a*, of build object 26 that are smaller than an effective camera pixel size, for example, can have a measured temperature that is influenced by cooler build material 20 surrounding object part layer 34*a*. For example, the measured temperature can be averaged over the fused object part layer 34*a* that is less than a camera pixel size and the surrounding build material 20, causing the sensed temperature to be lower than the actual temperature of object part layer 34*a*. Sacrificial object 28 can be any suitable size that can be sensed by at least one camera pixel of thermal sensor 16, and in some examples several camera pixels, entirely on sacrificial object 28. Sacrificial object 28 can provide an accurate indication of smaller object parts of build object 26 that are not able of being accurately thermally measured by the thermal sensor.

With additional reference to FIG. 1, each sacrificial layer 32 can have a surface area and position suitable to be accurately sensed, or measured, by thermal sensor 16. Thermal temperature can be periodically or continuously measured with thermal sensor 16 during formation of multiple sacrificial layers 32 of sacrificial object 28. In some examples, dispensing assembly 12 and thermal energy source 14 are positioned between thermal sensor 16 and sacrificial object 28 and thermal measurements of sacrificial layers 32 may be interrupted as it is moved across build surface 24. Sensed temperatures are transmitted from thermal sensor 16 to controller 18 and compared to a predetermined target temperature. The power level of thermal energy source 14 is adjusted based on the compared temperatures and the adjusted power level can be applied to a next layer of build object 26. In one example, the target temperature may be the same for each layer of the build volume.

The surface area of each sacrificial layer 32 can be a predetermined size. Sacrificial object 28 can be the same size and position on build surface 24 at each build layer 30. For example, sacrificial object 28 can be formed as a column. Sacrificial object 28 includes sacrificial layers 32 having surface area and position suitable to be accurately detected and thermal measurements taken by thermal sensor 16, such as a thermal imaging device. For example, surface area of each sacrificial layer 32 can be at least an effective camera pixel in size. In another example, sacrificial object 28 includes sacrificial layers 32 that are 15 mm×15 mm, or has a 15 mm×15 mm cross-sectional area.

In some examples, a sacrificial layer 32, or several sacrificial layers 32, of sacrificial object 28 is formed prior to forming a first layer, or lowest area in the z-axial direction, of the build object 26. Any number of sacrificial layers 32 can be formed as appropriate to provide temperature measurements by thermal sensor 16 and adjustments to thermal energy source 14 by controller 18 to stabilize the thermal temperature of additive manufacturing system 10 prior to beginning build object 26. Forming sacrificial layers 32 prior to a first object layer 34 provides thermal energy measurements and adjustments to be made to obtain a desired thermal energy level prior to the first object layer 34 of build object 26 being formed. The power level of thermal energy source 14 can be adjusted based on the measured thermal temperature of sacrificial layers 32 prior to forming first object layer 34 of build object 26 to stabilize the thermal temperature. The first object layer 34 of build object 26 can be sensitive to temperature differentiation. Sacrificial layers 32 can be formed throughout the build process of build object 26 and can be terminated with the completion of build object 26.

Figure 3:
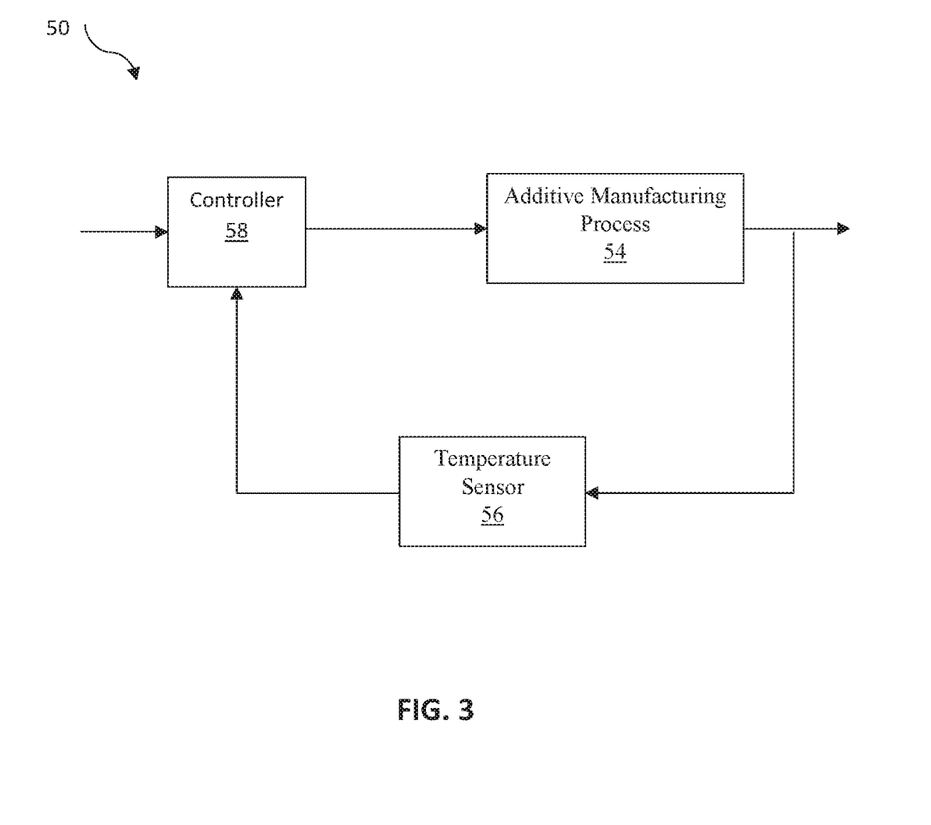
FIG. 3 is a block diagram of an example closed loop feedback system of an additive manufacturing system in accordance with aspects of the present disclosure.

FIG. 3 illustrates a block diagram of an example closed loop feedback system 50 of an additive manufacturing system in accordance with aspects of the present disclosure. System 50 includes an additive manufacturing process 54, a thermal sensor 56, and a controller 58. System 50 is similar to system 10. Additive manufacturing process 54 can include dispensing and fusing build material and fusing agent with a dispensing assembly and thermal energy source, as discussed above with respect to FIGS. 1 and 2. A fused part target temperature is input into controller 58, such as a proportional integral derivative (PID) controller, for example. The temperature of sacrificial objects can be measured by temperature sensor 56 and input into controller 58. Controller 58 can compare the measured temperature to a predetermined target temperature and adjust the thermal energy source until the subsequently measured temperature is equal to the target temperature. System 50 provides closed loop control of build object surface temperatures during a build process.

For example, thermal sensor 56 can measure a thermal temperature of a sacrificial layer (e.g., sacrificial layer 32 of FIG. 2). The sensed, or measured, temperature of the sacrificial layer is indicative of the build temperature of a build object layer (e.g., object layer 34 of FIG. 2). Accurately determined surface temperatures of sacrificial layers 32 of sacrificial object 28 can be measured by thermal sensor 56 and employed during the additive manufacturing process as a feedback to controller 58 to control thermal energy delivery from a thermal energy source. In one example, accurate surface temperature measurements enable closed loop feedback system 50 to provide correct energy dosing during the build process which improves part appearance, material properties and dimensional control. In some examples, thermal feedback of a sacrificial part fusing outside of the build area (e.g., in the thermal boundary region) of a build chamber can be used as an input to control system 50 to provide a customer with desired control of what is in each layer of the build and where the parts are located in the layer within the buildable area.

Figure 4:
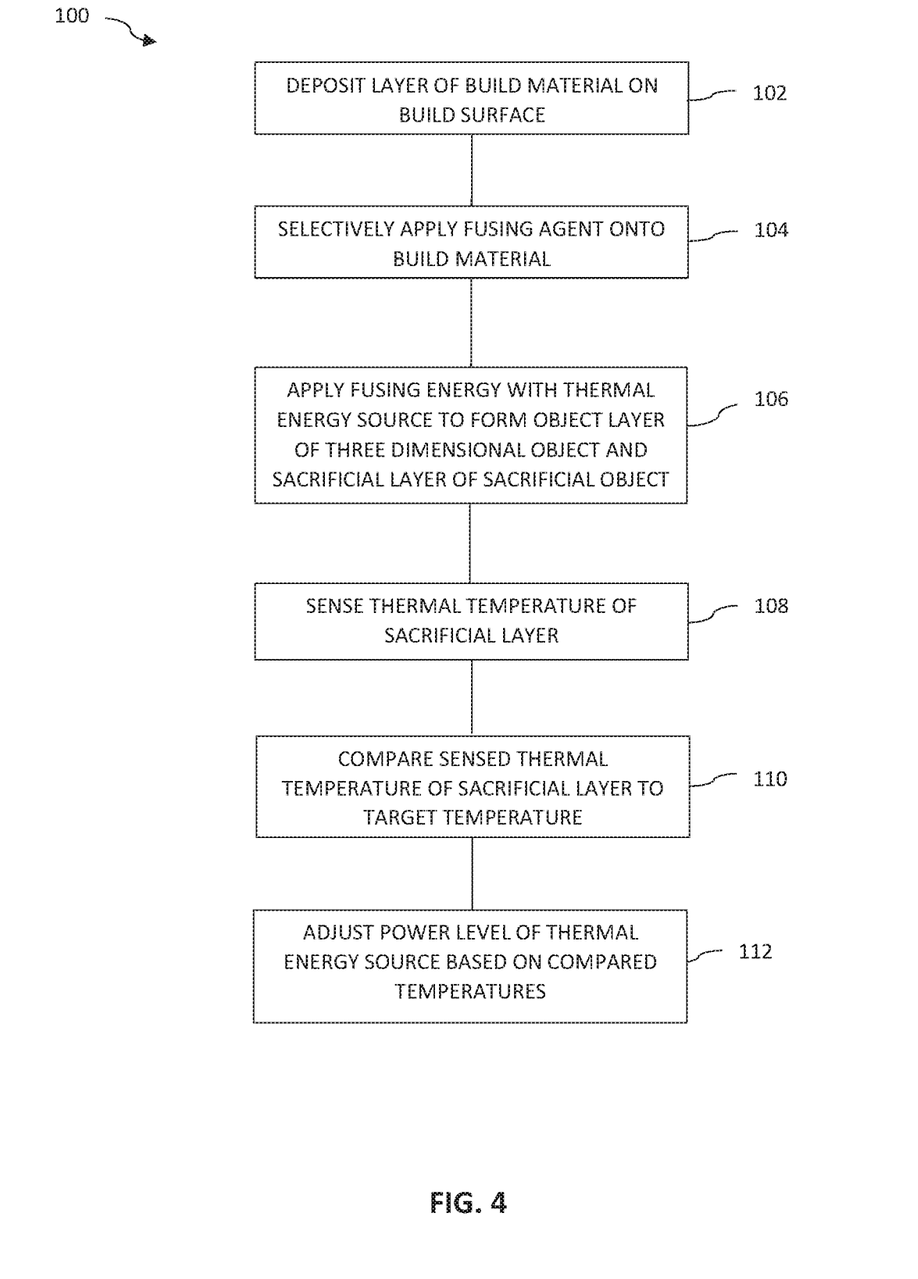
FIG. 4 is a flow chart of an example method of operating an additive manufacturing machine in accordance with aspects of the present disclosure.

FIG. 4 is a flow diagram of an example method 100 of operating an additive manufacturing machine in accordance with aspects of the present disclosure. At 102, a layer of a build material is deposited on a build surface. At 104, a fusing agent is selectively applied onto the build material. At 106, a fusing energy is applied to the layer with a thermal energy source to form an object layer of a three dimensional object and a sacrificial layer of a sacrificial object are formed. At 108, a thermal temperature of the sacrificial object is sensed. At 110, the sensed thermal temperature of the sacrificial object is compared to a target temperature. At 112, a power level of the thermal energy source is adjusted based on the compared temperatures. The above can be repeated as appropriate.

Figure 5:
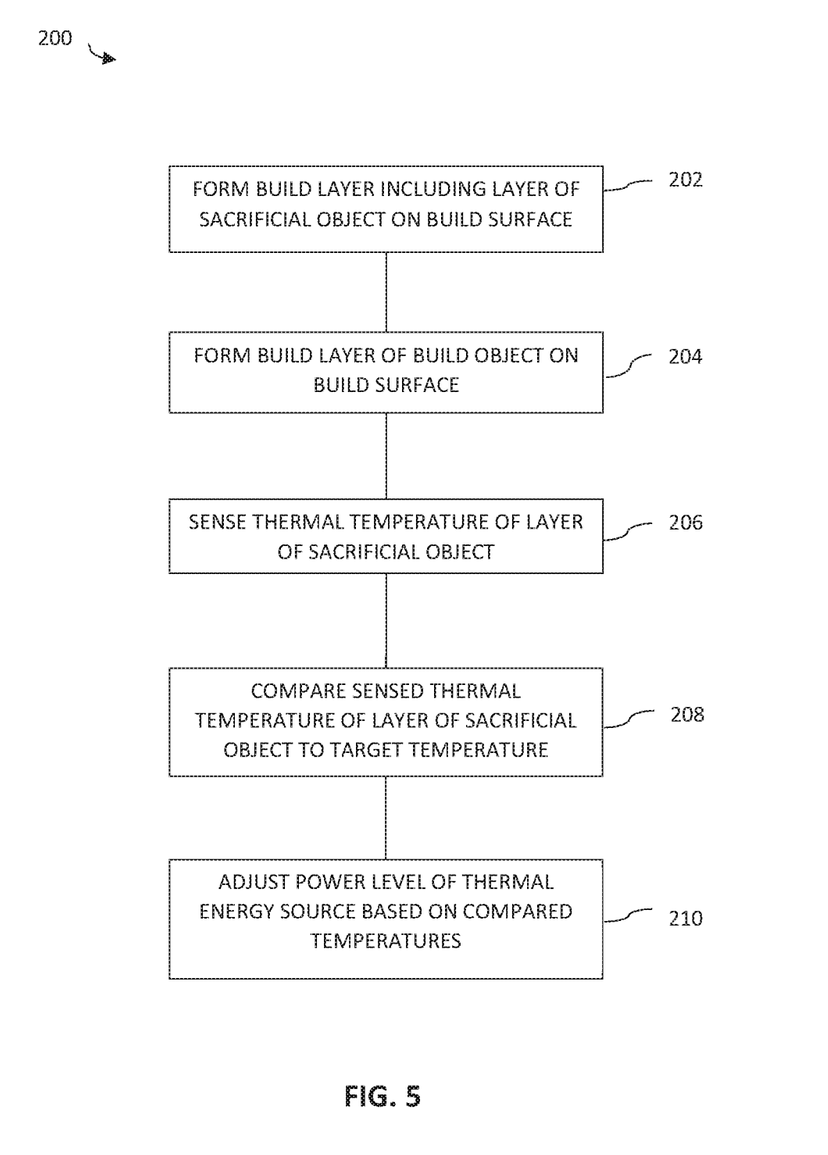
FIG. 5 is a flow chart of another example method of operating an additive manufacturing machine in accordance with aspects of the present disclosure.

FIG. 5 is a flow diagram of an example method 200 of operating an additive manufacturing machine in accordance with aspects of the present disclosure. At 202, a build layer including a layer of a sacrificial object on a build surface is formed. At 204, a build layer of a build object on the build surface is formed. At 206, a thermal temperature of the layer of the sacrificial object is sensed. At 208, the sensed thermal temperature of the layer of the sacrificial object is compared to a target temperature. At 210, a power level of the thermal energy source is adjusted based on the compared temperatures. The above can be repeated as appropriate.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method of operating an additive manufacturing machine, comprising:
forming a layer of a build material;
selectively applying a fusing agent onto the formed layer of build material;
applying, by a thermal energy source, fusing energy to the build material and the selectively applied fusing agent to form an object layer of a three dimensional object and a sacrificial layer of a sacrificial object at the selectively applied fusing agent;
sensing, by a thermal camera, a thermal temperature of the sacrificial layer in response to applying the fusing energy;
comparing the thermal temperature of the sacrificial layer to a targeted thermal temperature, the thermal temperature of the sacrificial layer of the sacrificial object serving as a proxy for the object layer of the three dimensional object; and
based on comparing the thermal temperature of the sacrificial layer of the sacrificial object to the targeted thermal temperature, adjusting a power level of the thermal energy source for subsequently applying fusing energy to the build material to form another object layer of the three dimensional object,
wherein the sacrificial layer of the sacrificial object has a predetermined size that corresponds to at least one camera pixel of the thermal camera.

2. The method of claim 1, wherein the three dimensional object is formed in a build area of the build surface and the sacrificial object is formed in a thermal boundary region outside of the build area.

3. The method of claim 1, comprising:
depositing a second layer of build material on the previously deposited layer and selectively applying fusing agent thereon;
applying, by the thermal energy source, fusing energy to the second layer with the adjusted power level of the thermal energy source to form a second sacrificial layer of the sacrificial object and a second layer of the three dimensional object;
sensing, by the thermal camera, a thermal temperature of the second sacrificial layer;
comparing the sensed thermal temperature of the second sacrificial layer to the targeted temperature; and
based on comparing the thermal temperature of the second sacrificial layer to the targeted temperature, adjusting a power level of the thermal energy source for a fusing energy to be subsequently applied.

4. The method of claim 3, wherein the sacrificial object has a constant size and position on the build surface throughout each subsequent sacrificial layer.

5. The method of claim 3, wherein each sacrificial layer of the sacrificial object is formed with each build layer that the three dimensional object is formed.

6. The method of claim 1, wherein the sacrificial object comprises a consistent repeatable feature of the sacrificial layer and each subsequent sacrificial layer, and sensing the thermal temperature comprises sensing the thermal temperature of the consistent repeatable feature for the sacrificial layer and each subsequent sacrificial layer.

7. A method of operating an additive manufacturing machine comprising:
forming a build layer on a build surface, the build layer including a sacrificial layer of a sacrificial object formed at a selectively applied fusing agent and an object layer of a three dimensional build object;
sensing a thermal temperature of the sacrificial layer with a thermal sensor in response to applying fusing energy to the build layer, the sacrificial layer having a predetermined surface size that corresponds to at least one camera pixel of the thermal sensor;
comparing the thermal temperature of the sacrificial layer to a targeted thermal temperature, the thermal temperature of the sacrificial layer of the sacrificial object serving as a proxy for the object layer of the three dimensional object; and
based on comparing the thermal temperature of the sacrificial layer of the sacrificial object to the targeted thermal temperature, adjusting a power level of the thermal energy source for subsequently applying fusing energy to form another object layer of the three dimensional object.

8. The method of claim 7, comprising:
forming a first sacrificial layer of the sacrificial object on the build surface prior to forming the build layer.

9. The method of claim 8, comprising:
forming a sacrificial layer of the sacrificial object within each build layer including an object layer of the three dimensional build object.

10. The method of claim 7, comprising:
forming the three dimensional build object based on data of a three dimensional model and forming the sacrificial object based on data generated by the additive manufacturing machine.

11. The method of claim 7, wherein the sacrificial object comprises a consistent repeatable feature of the sacrificial layer and each subsequent sacrificial layer, and sensing the thermal temperature comprises sensing the thermal temperature of the consistent repeatable feature for the sacrificial layer and each subsequent sacrificial layer.

\* \* \* \* \*